United States Patent
Inoue et al.

(10) Patent No.: US 12,345,623 B2
(45) Date of Patent: Jul. 1, 2025

(54) METHOD FOR EVALUATING DELAYED FRACTURE OF METAL MATERIAL

(71) Applicant: JFE STEEL CORPORATION, Tokyo (JP)

(72) Inventors: Naho Inoue, Tokyo (JP); Shinji Otsuka, Tokyo (JP); Daisuke Mizuno, Tokyo (JP); Nobuyuki Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 741 days.

(21) Appl. No.: 17/635,876

(22) PCT Filed: Jun. 10, 2020

(86) PCT No.: PCT/JP2020/022932
§ 371 (c)(1),
(2) Date: Feb. 16, 2022

(87) PCT Pub. No.: WO2021/033397
PCT Pub. Date: Feb. 25, 2021

(65) Prior Publication Data
US 2022/0291113 A1    Sep. 15, 2022

(30) Foreign Application Priority Data
Aug. 16, 2019   (JP) ................. 2019-149324

(51) Int. Cl.
*G01N 17/02* (2006.01)
*G01N 17/00* (2006.01)

(52) U.S. Cl.
CPC ........... *G01N 17/02* (2013.01); *G01N 17/006* (2013.01)

(58) Field of Classification Search
CPC ..... G01N 17/002; G01N 17/006; G01N 17/02
See application file for complete search history.

(56) References Cited

FOREIGN PATENT DOCUMENTS

| | | |
|---|---|---|
| CN | 1527935 A | 9/2004 |
| CN | 101738365 A | 6/2010 |
| CN | 107063985 A | 8/2017 |
| CN | 107782658 A | 3/2018 |
| EP | 1 408 324 A1 | 4/2004 |
| JP | H10-253524 A | 9/1998 |

(Continued)

OTHER PUBLICATIONS

Apr. 20, 2024 Office Action issued in Korean Patent Application No. 10-2022-7005095.

(Continued)

*Primary Examiner* — Lois L Zheng
(74) *Attorney, Agent, or Firm* — Oliff PLC (57) ABSTRACT

A method for evaluating a delayed fracture characteristic of a metal material that performs a step including a step (A) and a step (B) below once or a plurality of times to evaluate the delayed fracture characteristic of the metal material having been processed. Step (A): a step that brings an aqueous solution which includes a chloride ion into contact with a surface of the metal material to cause chloride of 1000 to 100000 mg/m² in chloride amount to deposit to the surface. Step (B): a step in which the metal material to which the chloride has deposited in the step (A) is left stationary in an air atmosphere at a temperature from −50 to 10° C. and at a relative humidity higher than or equal to a deliquescence humidity of the chloride.

3 Claims, 1 Drawing Sheet

(56) References Cited

FOREIGN PATENT DOCUMENTS

| | | | |
|---|---|---|---|
| JP | 2003-130787 A | 5/2003 |
| JP | 2005-181102 A | 7/2005 |
| JP | 2008-039599 A | 2/2008 |
| JP | 2010-025560 A | 2/2010 |
| JP | 2010-139450 A | 6/2010 |
| JP | 2011-174859 A | 9/2011 |
| JP | 2012-026945 A | 2/2012 |
| JP | 2013-029335 A | 2/2013 |
| JP | 2016-99259 A | 5/2016 |
| JP | 2016-180658 A | 10/2016 |
| JP | 6489292 B1 | 3/2019 |
| JP | 6573058 B1 | 9/2019 |
| WO | 2012/057932 A1 | 5/2012 |

OTHER PUBLICATIONS

Sep. 1, 2020 International Search Report issued in International Patent Application No. PCT/JP2020/022932.

Ootsuka et al; "Analysis of Effect of Automobile Moving Environment in Deicing Salt Spraying Area on Hydrogen Absorption into Steel Sheet by Using Temperature-compensating Hydrogen Absorption Monitoring System;" Tetsu-to-Hagane; vol. 103; No. 1; pp. 27-35; 2017.

Omoda, Masataka; "Corrosion monitoring of steel materials in cold snowy regions;" Proceedings of the Japan Conference on Materials and Environments; vol. 65; pp. 95-98; Oct. 12, 2018.

Mar. 27, 2024 Office Action issued in Chinese Patent Application No. 202080057772.2.

Apr. 20, 2023 Office Action issued in European Patent Application No. 20 853 795.1.

Jun. 21, 2024 Office Action issued in Chinese Patent Application No. 202080057772.2.

Jul. 15, 2022 Extended Search Report issued in European Patent Application No. 20853795.1.

B.F. Brown; "Stress Corrosion Cracking Control Measures NBS MONO 156;" National Institute of Standards And Technology (NIST); pp. 1-96; Jun. 1, 1977.

Nov. 13, 2023 Office Action issued in Chinese Patent Application No. 202080057772.2.

METHOD FOR EVALUATING DELAYED FRACTURE OF METAL MATERIAL

TECHNICAL FIELD

This application relates to a method for evaluating delayed fracture of a processed metal material used in an environment which is low-temperature high-humidity and in which de-icing salt being high in chloride deposits to the metal material.

BACKGROUND ART

Strength of automotive parts are being increased for decreasing the weight while improving collision safety of automotive parts. However, when the strength of a material is increased, a phenomenon referred to as "hydrogen embrittlement" occurs. By the hydrogen embrittlement, mechanical properties such as elongation are degraded when hydrogen penetrates into the material. The hydrogen embrittlement is also referred to as delayed fracture and is a phenomenon that suddenly breaks a high-strength part in an embrittling manner substantially without plastic deformation in appearance when time elapses while the high-strength material part is subjected to static load stress.

An increase in the amount of penetration of hydrogen into the material induces the occurrences of delayed fracture, and a delayed fracture sensitivity increases as the strength of the material increases. For example, in an ultra-high strength steel sheet having a tensile strength of higher than or equal to 1000 MPa, embrittlement may occur even in an atmospheric corrosion environment in which the hydrogen penetration amount is small. Thus, for actually using a high-strength material, it is required that delayed fracture evaluation for the material be correctly comprehended.

It is known that the behavior of hydrogen penetration into the material under the atmospheric corrosion environment varies between day and night and the hydrogen penetration amount increases most in transition zones to two states including a dry state (day) and a wet state (night). Accordingly, techniques in which the atmospheric environment in which the temperature and humidity vary between day and night is simulated and delayed fracture evaluation testing is performed under a corrosion cycle environment in which two states including the dry state and the wet state are repeated, thereby to evaluate delayed fracture due to hydrogen penetration under a corrosion environment are known (see, for example, Patent Literatures 1 to 3).

CITATION LIST

Patent Literature

PTL 1: Japanese Unexamined Patent Application Publication No. 2011-174859
PTL 2: Japanese Unexamined Patent Application Publication No. 2016-180658
PTL 3: Japanese Unexamined Patent Application Publication No. 2010-139450

SUMMARY

Technical Problem

Automobiles are used in various environments and may be used in a de-icing salt applied region which is a high-humidity environment and in which, for example, de-icing salt being high in chloride deposits to the automobiles. Thus, it is required that the delayed fracture characteristics in the de-icing salt applied region be evaluated. However, testing results of the delayed fracture characteristics under an actual environment in the de-icing salt applied region are different from testing results of the delayed fracture characteristics by using the techniques described in Patent Literatures 1 to 3. With the techniques of Patent Literatures 1 to 3, the delayed fracture characteristics under the low-temperature high-humidity and high-chloride environment cannot be accurately evaluated.

The present disclosure has been made in view of the above-described problem, and an object of the present application is to provide a method for evaluating delayed fracture characteristics of a metal material with which the delayed fracture characteristics under a low-temperature high-humidity and high-chloride environment can be accurately evaluated.

Solution to Problem

The inventors of the present application have achieved the above-described objective and the gist is as follows.

[1] A method for evaluating a delayed fracture characteristic of a metal material that performs a step including a step (A) and a step (B) below once or a plurality of times to evaluate the delayed fracture characteristic of the metal material having been processed.
Step (A): a step that brings an aqueous solution which includes a chloride ion into contact with a surface of the metal material to cause chloride of 1000 to 100000 mg/m$^2$ in chloride amount to deposit to the surface.
Step (B): a step in which the metal material to which the chloride has deposited in the step (A) is left stationary in an air atmosphere at a temperature from −50 to 10° C. and at a relative humidity higher than or equal to a deliquescence humidity of the chloride.

[2] In the method for evaluating a delayed fracture characteristic of a metal material described in [1], in the step (A), the chloride is caused to deposit to the metal material within ten minutes by using any one or more of techniques including immersion, atomizing, showering, spraying, and dripping.

Advantageous Effects

According to the present disclosure, delayed fracture characteristic can be accurately evaluated based on a processed condition of the processed metal material in an environment in which de-icing salt being high in chloride deposits in a low-temperature high-humidity atmosphere.

DESCRIPTION OF EMBODIMENTS

Figure 1:
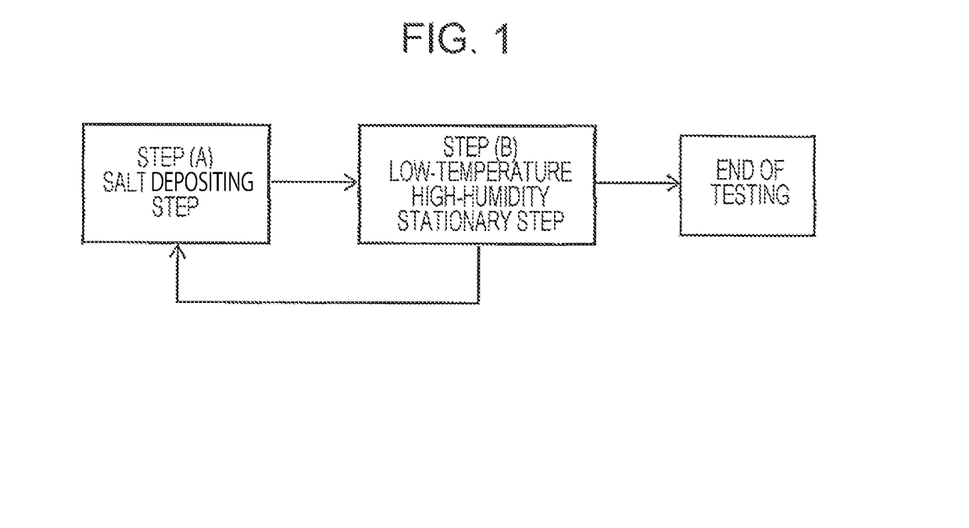
FIG. 1 is a process diagram illustrating a preferred embodiment of a method for evaluating delayed fracture of a metal material according to the present disclosure.

Hereinafter, an embodiment of the present disclosure is described. FIG. 1 is a process diagram illustrating a preferred embodiment of a method for evaluating delayed fracture of a metal material according to the present disclosure. The method for evaluating delayed fracture of a metal material illustrated in FIG. 1 evaluates delayed fracture characteristics, due to corrosion, of a metal material used under an environment which is a low-temperature high-humidity environment and in which a de-icing agent or other, being high in chloride, deposits to the metal material such as, for example, a de-icing salt applied region. The method for evaluating delayed fracture of a metal material is performed by performing step (A): a salt depositing step and step (B): a stationary step in an air atmosphere once or a plurality of times.

First, in order to investigate in detail how the amount of chloride in a de-icing salt applied region affects the delayed fracture of a metal material, a bending specimen was placed in the de-icing salt applied region and crack testing was performed. As a result, it has been found that, in order to appropriately evaluate the delayed fracture characteristics of the metal material, in addition to the deposited amount including the chloride in step (A), the temperature and relative humidity are required to be appropriately set in step (B) and the delayed fracture characteristics are required to be evaluated under the temperature and humidity conditions controlled within certain ranges.

The reason for this is thought to be that, during driving of vehicles, chloride included in the de-icing agent that has been applied to roads for freeze-proofing is caught and deposits to the materials of the vehicles, thereby increasing the likelihood of the materials of the vehicles being corroded. Furthermore, in the case of the de-icing salt applied environment, since a wet state under the snow continues at low temperature, the wet state of the surface of a steel sheet is different from that in the testing environment. It is thought that this also affects the delayed fracture characteristics. Mainly, de-icing agents include NaCl or $CaCl_2$ such as rock salt or common salt as the main component. Among the de-icing agents, de-icing agents including chloride are referred to as de-icing salt. De-icing agents such as, for example, organic de-icing agents or the like that do not include chloride are not included in the de-icing salt. Hereinafter, the details of step (A) and step (B) are described.

<Step (A): Salt Depositing Step>

Step (A) is a depositing step that causes a chloride component to deposit to the metal material. The chloride component includes an aqueous solution including a component that mainly includes chloride ions. Preferably, the chloride component is maintained as an aqueous solution at a test temperature. A chloride component that becomes solid at the test temperature is not suitable for the testing.

The component that mainly includes chloride ions refers to, for example, Cl ions in salt that includes Cl ions of NaCl, $MgCl_2$, $CaCl_2$, and the like. In consideration of an actual environment, the component caused to deposit to the metal material is preferably a component mainly including NaCl. The term "mainly including" refers to a case where the object occupies equal to or greater than 50% in wt % except for moisture. The component mainly including chloride ions may include only chloride (one or more types of NaCl, $MgCl_2$, $CaCl_2$, and the like) or may include a component other than chloride. Examples of the component other than chloride include, but not limited to, sulfide and a nitric acid compound included in the environment, urea mixed with the de-icing agent to be applied, and so forth.

The amount of chloride caused to deposit to the metal material (deposition amount of a solid without solvent such as water) is set to 1000 to 100000 $mg/m^2$. This amount of chloride corresponds to the amount of chloride estimated for the actual environment. The amount of chloride smaller than 1000 $mg/m^2$ is unlikely in the actual environment of the de-icing salt applied region where the chloride component is actively supplied and far from the actual environment. The amount of chloride smaller than 1000 $mg/m^2$ slows down the state of corrosion which mainly affect the penetration of hydrogen. Accordingly, this amount of chloride smaller than 1000 $mg/m^2$ is not suitable for the evaluation of delayed fracture. In an environment where the amount of chloride is greater than 100000 $mg/m^2$, a thicker water film is formed due to moisture absorption from an atmosphere. Thus, the testing becomes very similar to immersion testing and the actual environment is unable to be reproduced. Accordingly, in order to evaluate delayed fracture with the processed conditions in the de-icing salt environment, the amount of chloride is required to be about 1000 to 100000 $mg/m^2$. Within this range, the amount of chloride is preferably greater than or equal to 3000 $mg/m^2$, and more preferably, greater than or equal to 8000 $mg/m^2$ and smaller than or equal to 30000 $mg/m^2$.

Although a method for causing the component mainly including chloride ions to deposit to the surface of the metal material is not particularly limited, typically, a method in which a solution including the component mainly including chloride ions is caused to deposit to the surface of the metal material is adopted. Specifically, examples of this method include, for example, the following: immersion in which a test specimen is immersed in and is taken out from a solution to cause the component mainly including chloride ions to deposit to the surface of the steel sheet; a method in which a solution including a component mainly including chloride ions (typically, an aqueous solution such as salt water) is applied to the metal material by spraying or showering; a method in which very small droplets are caused to deposit by atomizing; and a method in which a predetermined amount of salt water are dripped with a pipette. Here, the droplets in the spraying and the showering are equal to or greater than 50 μm, and the droplets in the atomizing are equal to or smaller than 50 μm. The spraying refers to a manual technique and the showering refers to an electrical technique. There is not much difference in finish between the spraying and the showering.

The amount of chloride can be calculated by dividing the difference in mass between the metal material before the deposition and the metal material after the deposition by the area of a material to be tested. Furthermore, in the case of varying the amount of chloride, control can be performed by, for example, varying the concentration of the solution including the component mainly including chloride ions or, when the spraying application method is used, varying the weight of the amount of chloride in the solution applied to the metal material.

Time for performing step (A) is preferably within 10 minutes. When this time exceeds 10 minutes, it is thought that corrosion of the metal material is in progress without controlling the temperature and humidity. Accordingly, step (A) is preferably performed within time as short as possible, for example, about one minute.

<Step (B): Stationary Step Under Air Atmosphere>

Step B is a step in which the metal material having undergone step (A) is left stationary under an air atmosphere. The air atmosphere means a state in which the thickness of the water film is smaller than or equal to 10 mm. In step (B), when the testing is performed in such an immersion environment where the solution volume to specimen area ratio with respect to the surface of the steel sheet is, for example, greater than or equal to 5 $ml/cm^2$, dispersion of oxygen ascribable to corrosion significantly changes from that in the atmosphere, and accordingly, corrosion is different from corrosion in the actual environment. Thus, the test specimen is left stationary in the air atmosphere where the temperature and humidity are controlled. Step (B) is performed in a fixed environment without varying the relative humidity. When the relative humidity is fixed, an environment in which the surface of the steel sheet remains wet due to deposition of an aqueous solution including snow, ice, sleet, or the like that includes de-icing salt can be simulated.

It is generally known that, when the relative humidity is determined, wetting of the surface of the steel sheet occurs due to a moisture absorption property of chloride depending on the amount of added chloride. The present disclosure utilizes this. The wet state of the surface changes depending on the amount of added chloride, and the humidity higher than or equal to a humidity at which moisture absorption (deliquescence) of the added chloride occurs is maintained. It is required that, in order to absorb the moisture, the humidity be fixed to the following values for corresponding types of salt: in the case where a salt mainly including NaCl is used, the relative humidity is higher than or equal to 75% RH; in the case where a salt mainly including $MgCl_2$ is used, the relative humidity is higher than or equal to 33% RH; and in the case where a salt mainly including KCl is used, the relative humidity is higher than or equal to 84% RH. However, since it is difficult to stably control a humidity of higher than or equal to 98% in a testing machine, the upper limit of the moisture absorption is 98%.

In other words, the test specimen is left stationary in the air atmosphere the humidity of which is higher than or equal to the deliquescence humidity of the chloride. Here, a deliquescence phenomenon refers to a phenomenon in which salt absorbs water vapor in the atmosphere in a high humidity environment and becomes an aqueous solution. In a solid surface to which salt particles deposit, a water film is formed by the deliquescence of the salt in addition to the adsorption of water molecules corresponding to the relative humidity. Thus, as described above, the air atmosphere is maintained at a humidity higher than or equal to a humidity at which the absorption of moisture (deliquescence) of the added chloride occurs.

It is required that the average of temperatures of the air atmosphere in step (B) be −50 to 10° C., and it is also required that a control range of the temperature be within ±5° C. It has been found that, under a condition in which the temperature of the air atmosphere exceeds 10° C., the delayed fracture characteristics in a low-temperature environment cannot be correctly evaluated. Regarding this, when the temperature of the air atmosphere exceeds 10° C., a corrosion speed of the steel sheet increases, the surface of the steel sheet changes, and stress of the surface becomes relaxed. Since the ratio of the amount of hydrogen penetrating into the steel material contributing to delayed fracture is decreased, the delayed fracture characteristics for the same amount of corrosion is different. This is not preferable.

Furthermore, under a condition in which the temperature is lower than −50° C., it is expected that corrosion reaction involving generation of hydrogen does not progress due to the effect of freezing of a solution including salt water. Thus, it is thought that delayed fracture due to the penetration of hydrogen does not occur, and accordingly, this is not appropriate. The temperature of the air atmosphere may be fixed or varied within a predetermined range. Steps (A) and (B) are performed once or a plurality of times.

To specifically evaluate the delayed fracture characteristics by steps (A) and (B) described above, it is required to process the metal material. Examples of a method for processing include, for example, bending, bulging, stretching, and so forth. To evaluate the delayed fracture characteristics, it is required to apply stress to the metal material. Examples of the method for applying the stress include a method for fixing the metal material in a shape formed by applying the stress with bolts, a method for evaluating by using residual stress remaining after processing, and so forth.

Example 1

Hereinafter, examples of the present disclosure are described. Test specimens were fabricated from different steel grades A, B, C, D having a thickness of 1.4 mm. The delayed fracture characteristics were evaluated by using the fabricated test specimens. The components of the steel grades A, B, C, D are described in Table 1 below.

TABLE 1

|  | C (mass %) | Si (mass %) | Mn (mass %) | YS (MPa) | TS (MPa) |
|---|---|---|---|---|---|
| Steel grade A | 0.46 | 0.20 | 0.73 | 1370 | 1500 |
| Steel grade B | 0.20 | 0.33 | 1.60 | 1310 | 1520 |
| Steel grade C | 0.38 | 0.20 | 1.38 | 1350 | 1490 |
| Steel grade D | 0.42 | 0.08 | 0.66 | 1290 | 1510 |

<Fabrication of Test Specimens>

Figure 2:
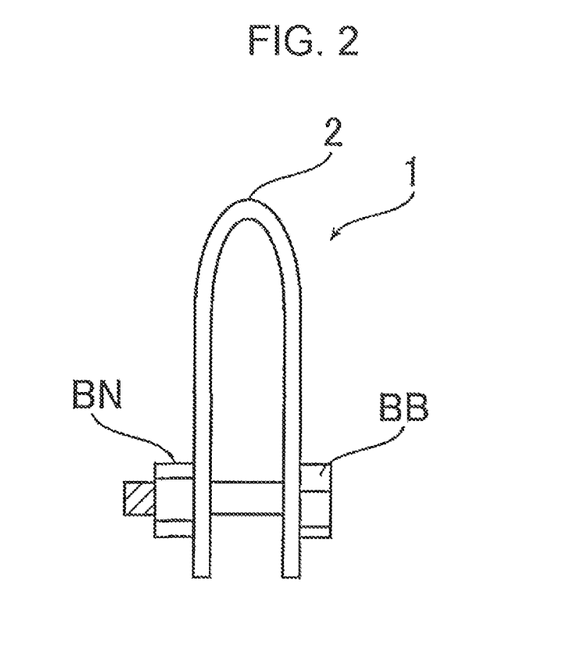
FIG. 2 is a schematic diagram illustrating an example of test specimens used for the method for evaluating delayed fracture.

The steel grades A, B, C, D were sheared to have a width of 35 mm and a length of 100 mm and ground so as to decrease the width to 30 mm for removing residual stress applied during shearing. Thus, steel sheets for testing were fabricated. FIG. 2 is a schematic diagram illustrating an example of the test specimens for evaluating delayed fracture. The above-described steel sheets for testing were immersed in toluene, subjected to ultrasonic cleaning for five minutes, and then bent 180° as illustrated in FIG. 2. The steel sheet in this state were constrained with a bolt BB and a nut BN to fabricate a test specimen 1. This test specimen 1 for evaluating delayed fracture has a bent portion 2 having a bend radius R of 4 to 9 mm, and a fastening width is 2R that is twice the bend radius R. A plurality of test specimens 1 were prepared such that bend radius of bent portions 2 of the different test specimens 1 was varied in six steps from each other by 1 mm. When the bend radius R is small, the likelihood of cracking of the test specimen 1 increases due to large applied load. When the bend radius R is large, the likelihood of cracking of the test specimen 1 decreases due to small applied load.

With the test specimens 1 of the steel grades A, B, both actual-environment testing in which crack testing was performed in an actual environment of an actual de-icing salt applied region and testing by using the method for evaluating delayed fracture of a metal material illustrated in FIG. 1 were performed. With the test specimens 1 of the steel grades C, D, the testing by using the method for evaluating delayed fracture of a metal material illustrated in FIG. 1 was performed.

<Actual Environment Testing>

In the actual environment testing, each of the test specimens was placed in a lower portion of a moving body that moved every day on roads on which de-icing salt was applied. These test specimens were collected 60th days after the start of the testing. The test specimens were placed in the lower portion of the moving body because this portion is subjected to the effect of the de-icing salt. Results of the testing are described in Table 2 below. The maximum bend radius with which cracking occurred during the testing is defined as a boundary for cracking and defined as a bend radius limit in the actual environment.

TABLE 2

| No. | Steel grade | Bend radius R | Result | Crack boundary |
|---|---|---|---|---|
| 1 | A | 4 | Crack | |
| 2 | A | 5 | Crack | |
| 3 | A | 6 | Crack | bend radius limit for cracking |
| 4 | A | 7 | No crack | |
| 5 | A | 8 | No crack | |
| 6 | A | 9 | No crack | |
| 7 | B | 4 | Crack | |
| 8 | B | 5 | Crack | bend radius limit for cracking |
| 9 | B | 6 | No crack | |
| 10 | B | 7 | No crack | |
| 11 | B | 8 | No crack | |
| 12 | B | 9 | No crack | |

In table 2, a condition of the test specimen in which a crack larger than or equal to 1 mm was found in the test specimen is described as cracking (described as Crack) and a condition in which the crack was smaller than 1 mm or no crack was found is described as no cracking (described as No crack). Furthermore, when the maximum bend radius is defined as the bend radius limit in the test specimens in which cracking occurred, the bend radius of steel A with which cracking occurred was 6 mm and the bend radius of steel B with which cracking occurred was 5 mm.

<Delayed Fracture Characteristics Testing>

The method for evaluating delayed fracture of a metal material illustrated in FIG. 1 was used, and the test duration at this time was 60 days at the maximum. The maximum bend radius with which cracking occurred during the testing was defined as the boundary for cracking and defined as the bend radius limit. Then, whether the delayed fracture characteristics testing is appropriate was determined by comparing the bend radius limit obtained in the delayed fracture characteristics testing with the bend radius limit obtained in the above-described actual environment testing. The relative humidity in the air atmosphere is allowed within ±5% of the set value as a testing range.

The testing conditions and the results of the delayed fracture evaluation testing are described in Table 3 and Table 4. In Table 3 and Table 4, the cases performed based on the testing conditions according to the embodiment of the present disclosure are each described as an example and the cases in which testing conditions underlined in Table 3 and Table 4 do not conform are each described as a comparative example. Conditions under which even a single test specimen did not crack is described as no data (marked with "-") for the bend radius limit.

TABLE 3

| | | Step (A) | | | | Step (B) | | | Bend radius limit for cracking (mm) | Applicability to delayed fracture evaluation | |
|---|---|---|---|---|---|---|---|---|---|---|---|
| No. | Steel grade | Main salt type | Chloride amount (mg/m²) | Deposition method | Temperature | Humidity | Testing environment | No. of repetitions | | | Remarks |
| 1 | A | NaCl | <u>800</u> | Immersion | 10 | 95 | Air atmosphere | 1 | 4 | No | Comparative example |
| 2 | A | NaCl | 1000 | Immersion | 10 | 95 | Air atmosphere | 1 | 6 | Yes | Example |
| 3 | A | NaCl | 8000 | Immersion | 10 | 95 | Air atmosphere | 1 | 6 | Yes | Example |
| 4 | A | NaCl | 10000 | Immersion | <u>15</u> | 95 | Air atmosphere | 1 | 7 | No | Comparative example |
| 5 | A | NaCl | 10000 | Immersion | 10 | 95 | Air atmosphere | 1 | 6 | Yes | Example |
| 6 | A | MgCl$_2$ | 1000 | Immersion | 10 | 95 | Air atmosphere | | 6 | Yes | Example |
| 7 | A | MgCl$_2$ | 10000 | Immersion | 10 | 95 | Air atmosphere | 1 | 6 | Yes | Example |
| 8 | A | MgCl$_2$ | 10000 | Immersion | 10 | 70 | Air atmosphere | 1 | 6 | Yes | Example |
| 9 | A | MgCl$_2$ | 10000 | Immersion | 10 | 35 | Air atmosphere | 1 | 6 | Yes | Example |
| 10 | A | MgCl$_2$ | 10000 | Immersion | 10 | <u>30</u> | Air atmosphere | 1 | 7 | No | Comparative example |
| 11 | A | MgCl$_2$ | 10000 | Immersion | <u>15</u> | 95 | Air atmosphere | 1 | 7 | No | Comparative example |
| 12 | A | MgCl$_2$ | 10000 | Drip | 10 | 95 | Air atmosphere | 1 | 6 | Yes | Example |
| 13 | A | MgCl$_2$ | 10000 | Spray | 10 | 95 | Air atmosphere | 1 | 6 | Yes | Example |
| 14 | A | MgCl$_2$ | 10000 | Atomize | 10 | 95 | Air atmosphere | 1 | 6 | Yes | Example |
| 15 | A | CaCl$_2$ | 1000 | Immersion | 10 | 95 | Air atmosphere | 1 | 6 | Yes | Example |
| 16 | A | CaCl$_2$ | 10000 | Immersion | 10 | 95 | Air atmosphere | 1 | 6 | Yes | Example |
| 17 | A | CaCl$_2$ | 10000 | Immersion | <u>15</u> | 95 | Air atmosphere | 1 | 7 | No | Comparative example |
| 18 | A | CaCl$_2$ | 10000 | Drip | 10 | 95 | Air atmosphere | 1 | 6 | Yes | Example |
| 19 | A | CaCl$_2$ | 10000 | Spray | 10 | 95 | Air atmosphere | 1 | 6 | Yes | Example |
| 20 | A | CaCl$_2$ | 10000 | Atomize | 10 | 95 | Air atmosphere | | 6 | Yes | Example |
| 21 | A | NaCl + CaCl$_2$ | 10000 | Immersion | 10 | 95 | Air atmosphere | 1 | 6 | Yes | Example |
| 22 | A | <u>Urea CO(NH$_2$)$_2$</u> | 10000 | Immersion | 10 | 95 | Air atmosphere | 1 | 4 | No | Comparative example |
| 23 | A | NaCl | 10000 | Atomize | 10 | 95 | Air atmosphere | | 6 | Yes | Example |
| 24 | A | NaCl | 10000 | Drip | 10 | 95 | Air atmosphere | | 6 | Yes | Example |
| 25 | A | NaCl | 10000 | Spray | 10 | 95 | Air atmosphere | | 6 | Yes | Example |
| 26 | A | NaCl | 10000 | Immersion | 10 | 95 | Air atmosphere | 2 (once/30 days) | 6 | Yes | Example |
| 27 | A | CaCl$_2$ | 10000 | Immersion | 10 | 95 | Air atmosphere | 2 (once/30 days) | 6 | Yes | Example |

TABLE 3-continued

| No. | Steel grade | Step (A) Main salt type | Step (A) Chloride amount (mg/m²) | Step (A) Deposition method | Step (B) Temperature | Step (B) Humidity | Step (B) Testing environment | Step (B) No. of repetitions | Bend radius limit for cracking (mm) | Applicability to delayed fracture evaluation | Remarks |
|---|---|---|---|---|---|---|---|---|---|---|---|
| 28 | A | NaCl | 10000 | Atomize | 10 | 95 | Air atmosphere | 2 (once/30 days) | 6 | Yes | Example |
| 29 | A | NaCl | 10000 | Immersion (15 min.) | 10 | 95 | Air atmosphere | 2 (once/30 days) | 6 | Yes | Example |
| 30 | A | NaCl | <u>120000</u> | Immersion | 10 | 95 | Air atmosphere | 2 (once/30 days) | 4 | No | Comparative example |
| 31 | A | NaCl | 10000 | Immersion | 10 | 95 | Air atmosphere | 3 (once/20 days) | 6 | Yes | Example |
| 32 | A | NaCl | 10000 | Atomize | 10 | 95 | Air atmosphere | 3 (once/20 days) | 6 | Yes | Example |
| 33 | A | NaCl | 10000 | Immersion | 10 | 95 | Air atmosphere | 5 (once/12 days) | 6 | Yes | Example |
| 34 | A | NaCl | 10000 | Immersion | 10 | 75 | Air atmosphere | 1 | 6 | Yes | Example |
| 35 | A | NaCl | 10000 | Immersion | 10 | <u>70</u> | Air atmosphere | 1 | — | No | Comparative example |
| 36 | A | NaCl | 10000 | Immersion | 10 | <u>30-90</u> | Air atmosphere | 2 | 5 | No | Comparative example |
| 37 | A | NaCl | 10000 | Immersion | <u>10-30</u> | <u>30-90</u> | Air atmosphere | 2 | 5 | No | Comparative example |
| 38 | A | NaCl | 10000 | Immersion | 0 | 95 | Air atmosphere |  | 6 | Yes | Example |
| 39 | A | NaCl | 10000 | Immersion | −40 | 95 | Air atmosphere | 1 | 6 | Yes | Example |
| 40 | A | NaCl | 10000 | Immersion | <u>−51</u> | 95 | Air atmosphere | 1 | — | No | Comparative example |
| 41 | A | NaCl | 10000 | Immersion (15 min.) | 10 | 95 | Air atmosphere | 1 | 6 | Yes | Example |
| 42 | A | NaCl | 30000 | Immersion | 10 | 95 | Air atmosphere | 1 | 6 | Yes | Example |
| 43 | A | NaCl | 50000 | Immersion | 10 | 95 | Air atmosphere |  | 6 | Yes | Example |
| 44 | A | NaCl | 100000 | Immersion | 10 | 95 | Air atmosphere | 1 | 6 | Yes | Example |

TABLE 4

| No. | Steel grade | Step (A) Main salt type | Step (A) Chloride amount (mg/m²) | Step (A) Deposition method | Step (B) Temperature | Step (B) Humidity | Step (B) Testing environment | Step (B) No. of repetitions | Bend radius limit for cracking (mm) | Applicability to delayed fracture evaluation | Remarks |
|---|---|---|---|---|---|---|---|---|---|---|---|
| 46 | A | NaCl | 10000 | Immersion | 10 | 95 | <u>Immersion</u> | 1 | 5 | No | Comparative example |
| 47 | B | NaCl | <u>800</u> | Immersion | 10 | 95 | Air atmosphere | 1 | 5 | Yes | Comparative example |
| 48 | B | NaCl | 1000 | Immersion | 10 | 95 | Air atmosphere | 1 | 4 | Yes | Example |
| 49 | B | NaCl | 8000 | Immersion | 10 | 95 | Air atmosphere | 1 | 5 | Yes | Example |
| 50 | B | NaCl | 10000 | Immersion | <u>15</u> | 95 | Air atmosphere | 1 | 6 | No | Comparative example |
| 51 | B | NaCl | 10000 | Immersion | 10 | 95 | Air atmosphere | 1 | 5 | Yes | Example |
| 52 | B | MgCl₂ | 1000 | Immersion | 10 | 95 | Air atmosphere | 1 | 5 | Yes | Example |
| 53 | B | MgCl₂ | 10000 | Immersion | 10 | 95 | Air atmosphere | 1 | 5 | Yes | Example |
| 54 | B | MgCl₂ | 10000 | Immersion | 10 | 70 | Air atmosphere | 1 | 5 | Yes | Example |
| 55 | B | MgCl₂ | 10000 | Immersion | 10 | 35 | Air atmosphere | 1 | 5 | Yes | Example |
| 56 | B | MgCl₂ | 10000 | Immersion | 10 | <u>30</u> | Air atmosphere | 1 | 6 | No | Comparative example |
| 57 | B | MgCl₂ | 10000 | Immersion | <u>15</u> | 95 | Air atmosphere | 1 | 6 | No | Comparative example |
| 58 | B | MgCl₂ | 10000 | Drip | 10 | 95 | Air atmosphere | 1 | 5 | Yes | Example |
| 59 | B | MgCl₂ | 10000 | Spray | 10 | 95 | Air atmosphere | 1 | 5 | Yes | Example |
| 60 | B | MgCl₂ | 10000 | Atomize | 10 | 95 | Air atmosphere | 1 | 5 | Yes | Example |
| 61 | B | CaCl₂ | 1000 | Immersion | 10 | 95 | Air atmosphere | 1 | 5 | Yes | Example |
| 62 | B | CaCl₂ | 10000 | Immersion | 10 | 95 | Air atmosphere | 1 | 5 | Yes | Example |
| 63 | B | CaCl₂ | 10000 | Spray | 10 | 95 | Air atmosphere | 1 | 5 | Yes | Example |
| 64 | B | CaCl₂ | 10000 | Atomize | 10 | 95 | Air atmosphere | 1 | 5 | Yes | Example |
| 65 | B | CaCl₂ | 10000 | Drip | 10 | 95 | Air atmosphere | 1 | 5 | Yes | Example |
| 66 | B | <u>Urea CO(NH₂)₂</u> | 10000 | Immersion | 10 | 95 | Air atmosphere | 1 | 4 | No | Comparative example |
| 67 | B | NaCl | 10000 | Atomize | 10 | 95 | Air atmosphere | 1 | 5 | Yes | Example |

TABLE 4-continued

| | | Step (A) | | | Step (B) | | | | Bend radius limit for cracking (mm) | Applicability to delayed fracture evaluation | |
|---|---|---|---|---|---|---|---|---|---|---|---|
| No. | Steel grade | Main salt type | Chloride amount (mg/m$^2$) | Deposition method | Temperature | Humidity | Testing environment | No. of repetitions | | | Remarks |
| 68 | B | NaCl | 10000 | Drip | 10 | 95 | Air atmosphere | 1 | 5 | Yes | Example |
| 69 | B | NaCl | 10000 | Immersion | 10 | 95 | Air atmosphere | 2 (once/30 days) | 5 | Yes | Example |
| 70 | B | CaCl$_2$ | 10000 | Immersion | 10 | 95 | Air atmosphere | 2 (once/30 days) | 5 | Yes | Example |
| 71 | B | NaCl | 10000 | Atomize | 10 | 95 | Air atmosphere | 2 (once/30 days) | 5 | Yes | Example |
| 72 | B | NaCl | 10000 | Immersion (15 min.) | 10 | 95 | Air atmosphere | 2 (once/30 days) | 5 | Yes | Example |
| 73 | B | NaCl | 120000 | Immersion | 10 | 95 | Air atmosphere | 2 (once/30 days) | 4 | No | Comparative example |
| 74 | B | NaCl | 10000 | Immersion | 10 | 95 | Air atmosphere | 3 (once/20 days) | 5 | Yes | Example |
| 75 | B | NaCl | 10000 | Atomize | 10 | 95 | Air atmosphere | 3 (once/20 days) | 5 | Yes | Example |
| 76 | B | NaCl | 10000 | Immersion | 10 | 95 | Air atmosphere | 5 (once/12 days) | 5 | Yes | Example |
| 77 | B | NaCl | 10000 | Immersion | 10 | 75 | Air atmosphere | 1 | 5 | Yes | Example |
| 78 | B | NaCl | 10000 | Immersion | 10 | 70 | Air atmosphere | 1 | — | No | Comparative example |
| 79 | B | NaCl | 10000 | Immersion | 10 | 30-90 | Air atmosphere | 2 | 4 | No | Comparative example |
| 80 | B | NaCl | 10000 | Immersion | 10-30 | 30-90 | Air atmosphere | 2 | 4 | No | Comparative example |
| 81 | B | NaCl | 10000 | Immersion | 0 | 95 | Air atmosphere | 1 | 5 | Yes | Example |
| 82 | B | NaCl | 10000 | Immersion | −40 | 95 | Air atmosphere | 1 | 5 | Yes | Example |
| 83 | B | NaCl | 10000 | Immersion | −51 | 95 | Air atmosphere | 1 | — | No | Comparative example |
| 84 | B | NaCl | 10000 | Immersion (15 min.) | 10 | 95 | Air atmosphere | 1 | 5 | Yes | Example |
| 85 | B | NaCl | 30000 | Immersion | 10 | 95 | Air atmosphere | 1 | 5 | Yes | Example |
| 86 | B | NaCl | 50000 | Immersion | 10 | 95 | Air atmosphere | | 5 | Yes | Example |
| 87 | B | NaCl | 100000 | Immersion | 10 | 95 | Air atmosphere | 1 | 5 | Yes | Example |
| 88 | B | NaCl | 120000 | Immersion | 10 | 95 | Air atmosphere | 1 | 4 | No | Comparative example |
| 89 | B | NaCl | 10000 | Immersion | 10 | 95 | Immersion | 1 | 4 | No | Comparative example |
| 90 | C | NaCl | 10000 | Immersion | 10 | 95 | Air atmosphere | 1 | 4 | Yes | Example |
| 91 | D | NaCl | 10000 | Immersion | 10 | 95 | Air atmosphere | 1 | 9 | Yes | Example |

The comparative example Nos. 36, 37, 79, 80 are comparative examples in which, as is the case with the related art, repeated cycles of a dry state (relative humidity of 30%) and a wet state (relative humidity of 90%) of the relative humidity were performed. In this related-art method, the bend radius limit became smaller than the result of the actual environment testing, and the testing results do not match. Furthermore, it has been found that, since the corrosion state was different when surface states of the test specimens were visually compared, these are not suitable for evaluating the environment which is the low-temperature high-humidity environment and in which de-icing salt being high in chloride is deposited.

In example Nos. 5, 7, 16, 21, 22, 51, 53, 62, 66, the amount of deposited salt was 10000 mg/m$^2$. However, main salt types were different from each other. Out of these, when a main salt type included chloride ions such as example Nos. 5, 7, 16, 21, 51, 53, 62, although changes in days of generation of the delayed fracture were recognized, the bend radius limit was coincident with the result of the actual environment testing. In contrast, in the cases of comparative example Nos. 22, 66 in which the main salt type was urea and chloride ions were not included, wetting of the surface did not occur even at high humidity and corrosion did not progress. Accordingly, the bend radius limit was not coincident with the result of the actual environment testing. Thus, it has been found that, in the conditions in which the main salt type is not chloride ions, the results are not coincident with the results of the actual environment testing. From this, it has been found that, although any type of salt is allowable, it is required to cause a component mainly including chloride ions to deposit to the test specimens.

Among example Nos. 1 to 3, 5, 42 to 45, 47 to 49, 51, 85 to 88, the main salt type (sodium chloride), the testing environment, and the cycle condition were coincident with each other while the amount of chloride was varied. It has been found that, out of these, the bend radius limit of example Nos. 2, 3, 5, 42 to 44, 48, 49, 51, 85 to 87 was coincident with the result of the actual environment testing. In contrast, in comparative example Nos. 1, 47, wetting was likely to be uneven due to the effect of a small amount of chloride, progress of corrosion was non-uniform over the entire surface of the test specimens, and the bend radius limit was not coincident with the results of the actual environment testing. Furthermore, in comparative example Nos. 45, 88, it is thought that the thickness of the water film was likely to increase due to the absorption of moisture, it was difficult to reliably cause a predetermined amount of chloride to deposit to the test specimens, and sufficient penetration of hydrogen did not occur. Thus, the bend radius limit was not coincident with the result of the actual environment testing. From the above description, it has been found that, although the effect of the amount of chloride does not change the testing results, 1000 to 100000 mg/m² of chloride is required from the viewpoint of evaluation and operation of experiment.

It has been found that, when the amount of chloride was varied in the case where the main salt type was calcium chloride or magnesium chloride in addition to the case where the main salt type was sodium chloride, as indicated by example Nos. 6, 7, 15, 16, 52, 53, 61, 62, the results of the bend radius limit were coincident with the results of the actual environment testing.

A pair of example Nos. 5, 46 and a pair of example Nos. 51, 89 each contrast the testing environment of the air atmosphere with the testing environment of immersion in step (B). When the testing environment was immersion as in example Nos. 46, 89, the bend radius limit was not coincident with the result of the actual environment testing. The reason for this is thought to be changes in the state of corroded surfaces due to immersion. From this, in order to make the corrosion environment the same, it is preferable that the testing be performed under the air atmosphere. In contrast, it is found that, when the testing environment was the air atmosphere as in example Nos. 5, 51, the bend radius limit was coincident with the result of the actual environment testing. Based on the above description, it has been found that step (B) is required to be performed in the air atmosphere.

Example Nos. 4, 5, 7, 11, 16, 17, 38 to 40, 50, 51, 53, 57, 81 to 83 are examples for which the test temperature was varied. It has been found that, out of these, the bend radius limit of example Nos. 5, 7, 16, 38, 39, 51, 53, 81 to 82 was coincident with the result of the actual environment testing regardless of the type of the main salt. In contrast, since the temperature was high in comparative example Nos. 4, 11, 17, 50, 57, the corrosion state changed. Thus, the bend radius limit was not coincident with the result of the actual environment testing and results became worse compared to the results of the actual environment. No cracking occurred in comparative example Nos. 40, 83. It has been confirmed that, when the test specimens were observed, due to excessively low temperature, salt water was frozen and precipitated salt and ice were in a completely separated states. Accordingly, it has been found that no corrosion occurred. Cracking did not occur because no corrosion occurred, and accordingly, the bend radius limit was not coincident with the result of the actual environment testing. From the above description, it has been found that the test temperature is preferably −50 to 10° C.

Example Nos. 5, 7 to 10, 34 to 35, 51, 53 to 56, 77 to 78 are examples for which the humidity condition was varied. These examples and comparative examples are related to the moisture absorption property of sodium chloride that is the salt used this time. In the case of sodium chloride, moisture absorption occurs at a relative humidity of 75% (=deliquescence humidity). Thus, in comparative example Nos. 35, 78, since moisture absorption (deliquescence) did not occur even at a relative humidity of higher than or equal to 65%, no wetting occurred on the surface of the test specimens and the form of corrosion was different. Accordingly, appropriate evaluation was unable to be performed. Furthermore, in the case of magnesium chloride, moisture absorption occurs at a humidity of higher than or equal to 33%. Thus, when the humidity was 30% in comparative example Nos. 10, 56, no moisture absorption (deliquescence) occurred and the form of corrosion was different. In contrast, since the humidity was higher than or equal to 35% in example Nos. 7 to 9, 53 to 55, the deliquescence humidity was exceeded and moisture absorption (deliquescence) occurred. Accordingly, wetting occurred and corrosion progressed. Thus, the results were coincident. Regardless of the type of salt, the humidity condition is preferably fixed at a high humidity.

Example Nos. 5, 7, 12 to 14, 16, 18 to 20, 23 to 25, 41, 51, 53, 58 to 60, 62 to 65, 67 to 68, 84 are examples for which a deposition method of chloride is changed. The bend radius limit of all these examples was coincident with the result of the actual environment testing regardless of the type of main salt with each of the following method: the immersion in which the test specimens were each immersed in for one minute and was taken out from a solution to cause the component mainly including chloride ions to deposit to the surface of the steel sheet; a method in which a solution including a component mainly including chloride ions (typically, an aqueous solution such as salt water) was applied to the metal material by spraying or showering; a method in which very small droplets were caused to deposit by atomizing; and a method in which a predetermined amount of salt water were dripped with a pipette. However, in example Nos. 41, 84, operation time for immersion in step (A) was long and, when the test specimens were kept immersed in the solution for 15 minutes, progression of corrosion was recognized during step (A). Although it is within a tolerance, in order to accurately perform testing, step (A) is preferably performed within ten minutes because the evaluation results of the bend radius limit may be deviated due to penetration of hydrogen caused by progression of corrosion during step (A). Furthermore, application by using dripping requires a sophisticated technique for uniform application over the entirety of the surface of the steel sheet. Thus, immersion, spraying, showering, and atomizing which are easily operated are preferred.

Example Nos. 5, 26 to 33, 51, 69 to 76 are examples with different numbers of cycles. Since a cleaning process is not included according to the present disclosure, repeatedly performing steps (A) and (B) means an increase in the amount of chloride. Since the amount of chloride was excessive in comparative example Nos. 30, 73, the bend radius limit was not coincident with the result of the actual environment testing. Since the coincidence with the result of the actual environment testing is obtained when a total of the amount of chloride due to repetitions of the cycle falls within the range of the claims of the present testing, the total amount of chloride is preferably 1000 to 100000 mg/m².

<Evaluation of Material>

Furthermore, with hydrochloric acid immersion, which is the related-art method for evaluating delayed fracture, only comparison among materials under the same condition is possible. However, with the present evaluation, it is characterized that a boundary for use of a material itself is determined. Furthermore, according to the present disclosure, the delayed fracture characteristics are evaluated from the bend radius limit for steel C and steel D. Regarding steel C, the cracked test specimen cracked only under the severest bending condition of R=4 mm, and the number of days when cracking occurs was near the maximum evaluation period. According to the present example, it has been clarified that since the bend radius limit of steel C is small, the steel C has good delayed fracture characteristics. In contrast, regarding steel D, most of the test specimens cracked immediately after the start of the testing, and the maximum cracking radius was R=9 mm. Thus, since the bend radius limit of steel D is greater than that of the present testing, steel D has low delayed fracture characteristics. Accordingly, a use boundary of a material itself can be evaluated by using the technology of the present disclosure.

The embodiment according to the present disclosure is not limited to the above-described embodiment and can be changed in various manners. For example, although the metal material to be evaluated is typically a steel material such as a steel sheet, this is not limiting. The metal material to be evaluated may be a metal material such as Ti or Al. Since a method for evaluating delayed fracture characteristics according to the present disclosure can correctly evaluate the delayed fracture characteristics of the metal material, the metal material (especially, a steel material such as a steel sheet) evaluated and selected by using this method has a good delayed fracture characteristics.

The invention claimed is:

1. A method for evaluating a delayed fracture characteristic of a metal material, the method comprising:
   bringing an aqueous solution comprising a chloride ion into contact with a surface of the metal material such that chloride in an amount of from 1000 to 100000 mg/m$^2$ is deposited on the surface thereof, and
   leaving the metal material stationary in an air atmosphere at a temperature from −50 to 10° C. and at a relative humidity higher than or equal to a deliquescence humidity of the chloride,
   wherein the bringing and the leaving are performed once or a plurality of times to evaluate the delayed fracture characteristic of the metal material, and
   wherein the method does not include a drying step where a humidity in the air atmosphere is lower than the deliquescence humidity of the chloride.

2. The method according to claim 1, wherein,
   the bringing comprises depositing the chloride to the metal material in less than ten minutes by at least one selected from the group consisting of immersion, atomizing, showering, spraying, and dripping.

3. The method according to claim 1, wherein a humidity in the air atmosphere is maintained at the relative humidity higher than or equal to a deliquescence humidity of the chloride during the leaving.

* * * * *